United States Patent [19]

Boeckmann et al.

[11] Patent Number: 5,019,027
[45] Date of Patent: May 28, 1991

[54] METHOD AND APPARATUS FOR SEALING RECLOSABLE FLEXIBLE CONTAINERS WITHOUT SPOT SEALING

[75] Inventors: Hugo Boeckmann, Arlington Heights; Donald L. Van Erden, Wildwood; Mark D. Bauer, Mount Prospect, all of Ill.

[73] Assignee: The Dow Chemical Company, Midland, Mich.

[21] Appl. No.: 491,330

[22] Filed: Mar. 9, 1990

[51] Int. Cl.⁵ ............................................. B31B 1/66
[52] U.S. Cl. .................................. 493/209; 493/206; 493/207; 493/193; 493/194; 493/214
[58] Field of Search ............... 493/193, 194, 206, 207, 493/209, 213, 214, 470, 205, 208; 156/583.1, 583.3

[56] References Cited

U.S. PATENT DOCUMENTS

| | | | |
|---|---|---|---|
| 3,575,096 | 4/1971 | Hook | 493/194 |
| 3,847,711 | 11/1974 | Howard | 156/515 |
| 3,915,077 | 10/1975 | LaFleur et al. | 493/194 |
| 4,582,555 | 4/1986 | Bower | 493/193 |

FOREIGN PATENT DOCUMENTS 0469937  8/1937  United Kingdom ................ 493/206

Primary Examiner—Frederick R. Schmidt
Assistant Examiner—John Addison Marlott
Attorney, Agent, or Firm—Killworth Gottman, Hagan Schaeff

[57] ABSTRACT

An apparatus and method for manufacturing reclosable thermoplastic containers which eliminates the need for spot-sealing zipper closures or zipper closure elements to a web of thermoplastic film prior to forming side seals and zipper end seals is provided. Opposing seal jaws provide increased heat and pressure to zipper closures in a manner which results in improved hermetic and fluid-tight side seals and zipper end seals.

28 Claims, 2 Drawing Sheets

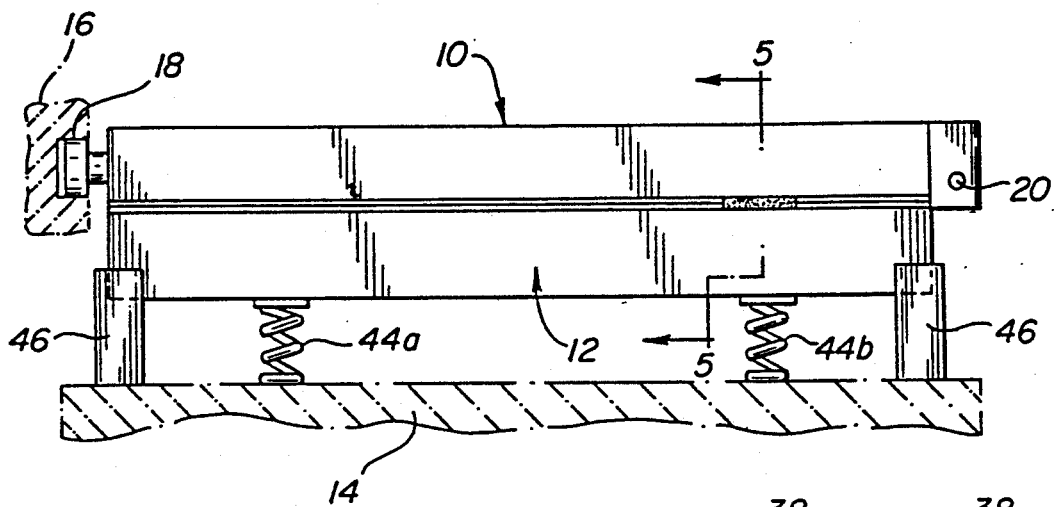
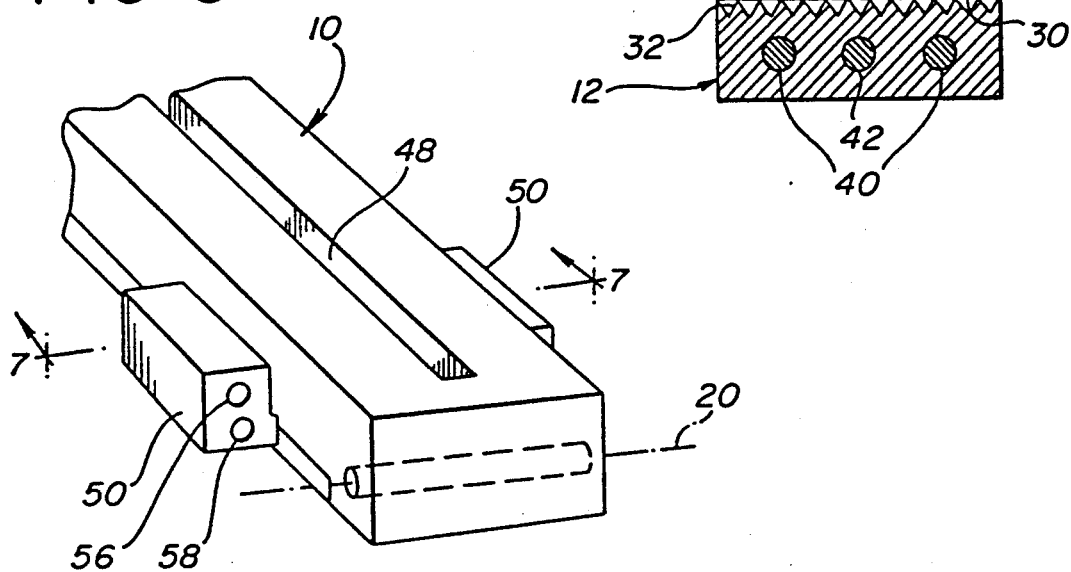
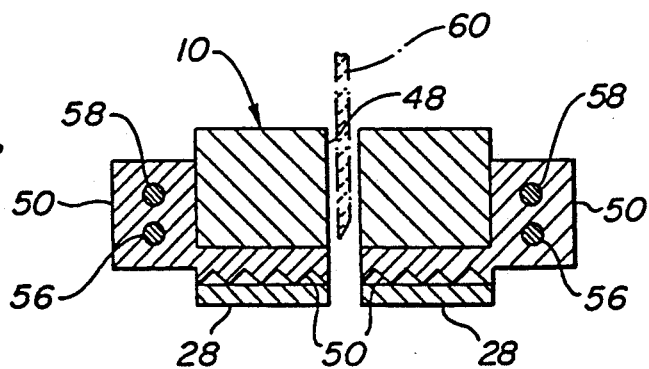

METHOD AND APPARATUS FOR SEALING RECLOSABLE FLEXIBLE CONTAINERS WITHOUT SPOT SEALING

BACKGROUND OF THE INVENTION

The present invention relates to improvements in the manufacture of reclosable flexible containers, and more particularly relates to a method and apparatus for sealing zipper closures along the side seams of the containers during the manufacture thereof.

Reclosable flexible containers are well-known in the art. Such containers normally comprise a bag-like structure made from a folded web of thermoplastic film. Both single and multiple ply laminated films are commonly used. Zipper closures, comprising interlocking male and female zipper closure elements, may be formed and secured to the underlying film web in a number of ways. The zipper closure elements can be formed by extruding each zipper closure element with the film and then interlocking the elements to form the zipper closure. The closure elements may also be separately extruded, interlocked, and then fused or otherwise attached to the film. Or, the closure elements may be separately extruded, fused or otherwise attached to the film, and then interlocked to form the zipper closure. When the zipper closure elements and film are separately extruded, the zipper closures or zipper closure elements and film are typically brought together and fused while still warm.

A problem has existed in the art in providing good quality seals in the areas on the sides of the containers adjacent to the zippers and to the ends of the zippers themselves. The provision of zipper closures on the film web leads to difficulties in the manufacture of the containers since the plies of thermoplastic material then include portions of nonuniform thicknesses.

One attempt at addressing this problem is that before flexible containers are formed from the web of thermoplastic film, the film, with zipper closures or separate zipper closure elements fused thereon, is subjected to a spot-sealing step. Referred to variously as stomping, welding, and pre-sealing, the step of spot-sealing comprises the application of heat and/or pressure to the zipper closures or separate zipper closure elements in an area in which the film is ultimately to be sealed and severed into individual bags to flatten out additional thickness which is presented by the zipper closures. This area of spot-sealing is ordinarily wider than necessary to accommodate variations in position of the film when it is sealed and severed into individual flexible containers.

Spot-sealing has the effect of reducing the thickness of the zipper closures vis-a-vis the thermoplastic film, which reduction enhances the manufacture of leak-proof zipper end seals. The step of spot-sealing may occur either as an early step in the manufacturing of flexible containers, for example as when such containers are made on vertical packaging machines, or as a step in preparing a supply of thermoplastic film with zipper closures or separate zipper closure elements spot-sealed thereon for later use on container manufacturing or packaging equipment, such as rotary drum machines or horizontal packaging equipment.

Typically, in the manufacture of flexible containers, the web of thermoplastic film is folded into a U-shaped configuration which defines a bottom edge and opposing side-walls or plies. A bag-like structure is created when the folded film is then sealed and severed into individual bags. So formed, the zipper closures are located near but spaced below the top edge of the flexible container.

Variations in this basic manufacturing process arise where products are packaged and hermetically sealed in the flexible containers at the point of manufacture. By way of example, on vertical packaging machines, a step-wise process is involved wherein, first, the web of thermoplastic film and zipper closure elements are extruded and fused; second, the film is advanced to a station for spot-sealing; third, the film is folded and the zipper closure elements brought together; next, one side seal is formed; then, the product inserted or the bag filled; the second side seal is completed to enclose the product; and, finally, the first and second side seals are severed to separate the packaged products. On horizontal packaging machines, for example, the film may more typically be supplied with spot-sealed zipper closures in place, the film wrapped around a product, and the side seals completed, all in a continuous, rather than step-wise, operation.

Simplification of flexible container manufacturing processes and packaging processes has long been the object of attention in the industry. Such simplification desirably reduces the cost and time required to produce reclosable flexible containers or to package products in such containers. Of further concern has been the occurrence of inadequate zipper end seals in the side seals of flexible containers produced on conventional machines. Despite spot-sealing techniques, leakage of container contents and migration of bacteria into the containers has been found to occur through inadequate zipper end seals.

Inadequate zipper end seals have arisen as a result of the crushing pressure of opposing seal jaws used to form the side seals of flexible containers. Such crushing pressure has been found to distort zipper closures, resulting in poor zipper closure properties near the flexible container side seals. Attempts to obtain good hermetic and fluid-tight zipper end seals have not been satisfactory. Reduction of the crushing pressures imposed by opposing seal jaws on the zipper closures may result in areas between the raised zipper closures and the film at the zipper end seals remaining unsealed. Compensatory increases in sealing temperatures to cause plastic to flow into these areas has resulted in the delamination of individual plies of composite thermoplastic materials used in many flexible container applications.

Accordingly, further improvements in manufacturing zipper end seals have been a continuing object of attention in the art, and further improvements are needed to attain the desired leak-proof zipper end seals.

SUMMARY OF THE INVENTION

The present invention meets the need for a simplified system for manufacturing flexible containers. That is, the apparatus and method of the present invention eliminate the need for the step of spot-sealing zipper closures on zipper closure elements to the web of thermoplastic film. Moreover, in so doing, improved hermetic and fluid-tight, leak proof side seals and zipper end seals are achieved.

The apparatus of the present invention is designed for sealing non-spot-sealed areas of a folded web of thermoplastic film, including zipper closures, which ultimately become the side seals and zipper end seals of reclosable flexible containers. The apparatus of the present invention may be used on existing, as well as on new, flexible container manufacturing or related packaging equipment.

The apparatus of the present invention comprises a pair of opposing first and second seal jaws. The first seal jaw functions to provide sealing pressure in the flat areas of the film to be sealed, and also functions to provide both sealing pressure and sealing heat in the area of the zipper closures to be sealed. The additional heat and pressure applied directly to the zipper closure area enhances sealing there. The second seal jaw generally functions to provide sealing heat over the entire area of the film, including zipper closures, to be sealed. Supported by springs, the second seal jaw also provides additional countervailing force in the area of the zipper closures in reaction to pressure imposed by the first seal jaw.

The first seal jaw has first and second working surfaces which engage, respectively, the flat areas and zipper closures areas of the folded web of thermoplastic film to be sealed. The first working surface is comprised of a resilient pressure pad, such as a durable silicone rubber pad which is unaffected by the sealing temperatures utilized. The second working surface is comprised of a patterned, heat-conductive, non-resilient surface, such as a steel or aluminum surface which may be coated with a heat resistant, nonstick agent such as Teflon (trademark). The first seal jaw further includes one or more heating elements for adjustably heating the second working surface so that additional heat may be applied directly to the zipper closure area.

The second seal jaw is comprised of a heatconductive, non-resilient third working surface which is adjustably heated by heating elements disposed in the second seal jaw. The third working surface engages the flat areas and zipper closures areas, respectively, of the film to be sealed. The third working surface preferably is patterned, for example a ribbed pattern, to prevent the film from sliding during the sealing and severing of the film. A portion of the third working surface, immediately beneath the second working surface on the first seal jaw may have a modified pattern which matches and can intermesh with the pattern on the second working surface. A coarse (in size), cross-hatched pattern which intermeshes with the second working surface is preferred. Such a cross-hatched pattern may also be continued over the entire third working surface to prevent the film from sliding.

A further aspect of the present invention, is the design of compressible means, such as springs, which support the second seal jaw against the sealing pressure imposed by the first seal jaw. As preferred in the present invention, at least two compressible springs support the second seal jaw in a housing wherein the second seal jaw may be displaced in the direction of compression. The springs are designed to have different spring constants, but demonstrate the same effective length when supporting the second seal jaw prior to the engagement of film between opposing seal jaws for sealing. Thus, when the first seal jaw imparts sealing pressure to the second seal jaw, the springs react with different force to displacement, and impose a skewed or asymmetric loading profile upon the second seal jaw. In the present invention, the springs are placed, accordingly, to react with greater force in the area of the zipper closures, thereby enhancing the sealing pressure imposed by the third working surface on the second seal jaw in that area. Although springs are preferred, other compressible means, such as unevenly matched pneumatic pistons, air shocks or the like may also be used to impose the asymmetric loading profile. Preferably, the compressible means provide an initial force in the area of the zipper closures which is greater, by a factor of 4 to 5, than the force provided to the remainder of the film.

Conventional means may be used to cyclically reciprocate the first and second seal jaws into sealing cooperation, and will differ with the flexible container manufacturing or packaging equipment upon which the present invention is installed. One such means, as used on a horizontal Hayssen packaging machine, comprises a hinge and cam follower arrangement attached to opposite ends of the first seal jaw. With the hinge placed at the end closest the zipper closures area to be sealed, the cam follower cyclically raises and lowers the opposing end to bring the seal jaws into sealing cooperation. While for purposes of illustration the first and second sealing jaws have been defined as having certain functions, respectively, those functions may be reversed and equally performed on the second and first seal jaws, respectively, without effect on the invention as disclosed.

We have found that the combination of increasing the heat and pressure in the area of the zipper closures to be sealed results in an improved side seal and zipper end seal. Additional heat introduced by the first seal jaw into the area of the zipper closure causes thermoplastic film material to soften and flow into voids between the zipper closures and the film and between the zipper closure elements themselves to form a durable, fluid tight seal. Further, for dual and multiple ply laminated films having an inner seal layer, the additional heat and pressure applied melts the inner seal layer and produces more durable and fluid tight side seals and zipper end seals. The optional use of an intermeshing pattern on the second and third working surfaces further promotes such flow, as well as strengthening the side seals and zipper end seals.

While crushing pressure is avoided, significant sealing pressure is positively applied to non-spot sealed zipper closures engaged between the first and second seal jaws, resulting in improved side seals and zipper end seals. This sealing pressure is due, in part to the non-resilient nature of the second working surface of the first seal jaw, which permits the springs supporting the second seal jaw to have the desired effect of locally increasing pressure on the area of the zipper closures to be sealed.

A further advantage of the present invention is that the step of spot sealing zipper elements to the film may be eliminated. This advantage results from the formation of superior side seals and zipper end seals from increased heat and pressure brought to bear on the zipper closures areas to be sealed.

Finally, another advantage of the present invention is that, in an alternative embodiment, the apparatus may be retrofitted to improve the function of existing seal jaws, or may be incorporated in new seal jaw pairs which may be installed on existing equipment. In either case, existing flexible container manufacturing or packaging equipment may be adapted to provide improved side seals and zipper end seals without need for spot-sealing the web of thermoplastic film.

The present invention further includes an improved method for manufacturing flexible containers comprising the steps of providing a web of thermoplastic film having interlocking zipper closure elements attached thereto without spot-sealing, folding the web to form opposing container side walls or plies, whereupon the zipper closure elements are in opposing, engageable or, alternatively, interlocked relationship, and then engaging the plies between first and second seal jaws to form a first side seal. The plies are advanced and then engaged again between first and second seal jaws to form a second side seal. The plies are then severed along the length of the first and second side seals to form individual flexible containers.

Because the step of spot-sealing zipper closures or zipper closure elements onto the web of thermoplastic film has necessarily involved an area of the film greater than that needed to form side seals and zipper end seals, by eliminating spot sealing and instead creating air-tight and fluid-tight seals in one step, the present invention permits wider flexible containers and mouth openings to be formed from an equal amount of film. Alternatively, less film may be used to form individual flexible containers or to package items of a given size, as is desired.

Accordingly, it is an object of the present invention to provide a method and apparatus for sealing zipper closures along the side seams of the containers during the manufacture thereof to provide hermetic and fluid-tight seals without the need for spot sealing of the zipper closures. This, and other objects and advantages of the present invention, will become apparent from the following detailed description, the accompanying drawings, and the appended claims.

BRIEF DESCRIPTION OF THE DRAWINGS

FIG. 4 is an elevational view of the first and second seal jaws in a closed position for sealing;

FIG. 5 is a cross-section of the first and second seal jaws of FIG. 4 taken along line 5—5 in FIG. 4;

FIG. 6 is a perspective view of an alternative embodiment of the first seal jaw wherein the second working surface and related heating elements are demountable; and FIG. 7 is a cross-section of the first seal jaw of FIG. 6 taken along line 7—7 in FIG. 6.

DETAILED DESCRIPTION OF THE PREFERRED EMBODIMENT

Figure 1:
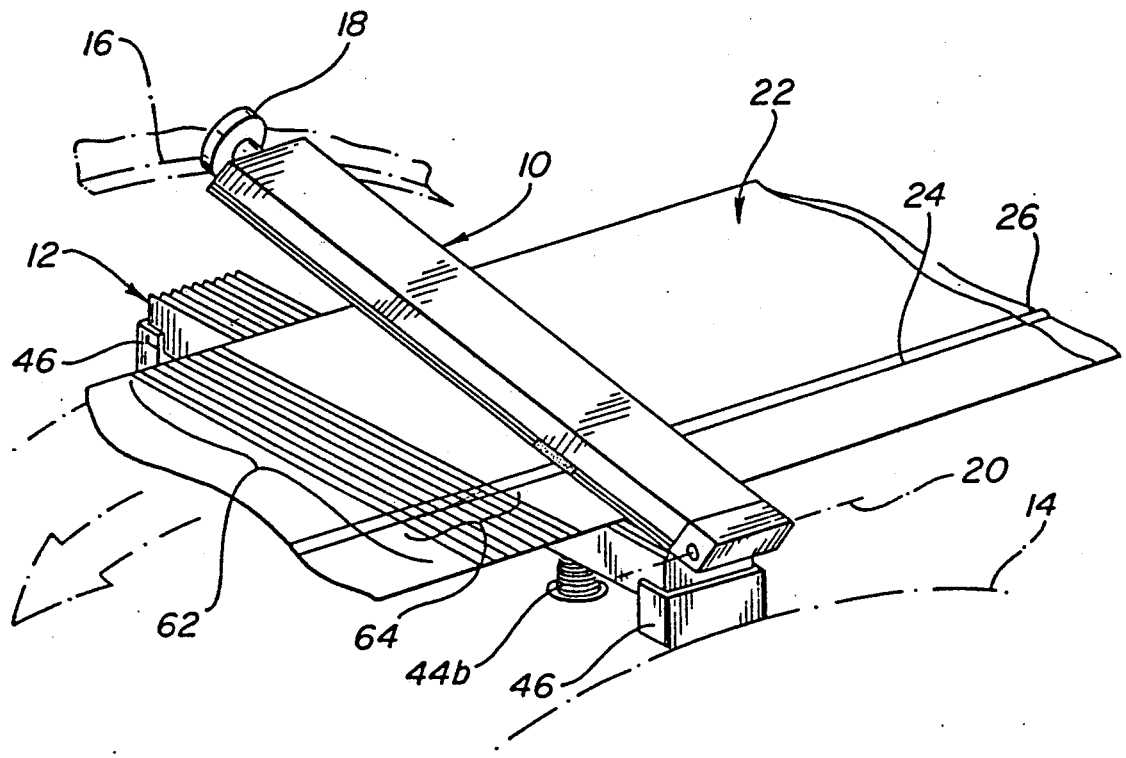
FIG. 1 is a perspective view of the present invention, the first and second seal jaws shown in an open position.

Referring to FIG. 1, first and second seal jaws 10, 12, respectively, of the present invention are shown in an open position, representatively installed on a rotary drum machine 14 typical of those used in the manufacture of flexible containers. Shown in dashed lines, rotary drum machine 14 further includes a cam 16 in which cam follower 18 travels to open and close first and second seal jaws 10, 12 in cooperation with hinge 20. Hinge 20 is disposed in first seal jaw 10, and its position is indicated by a dashed line.

As shown in FIG. 1, film web 22 is being drawn in the direction of the arrow between the seal jaws in a U-folded configuration with complementary interlocked zipper closure elements 24, 26. The film web may be of a single ply of thermoplastic material, or may be one of a number of dual or multiple ply laminates conventionally used in the art. For example, film web 22 may be a laminate of oriented polypropylene having a Saran (trademark) inner seal layer. Alternatively, film web 22 may be a laminate of nylon having an ethylene vinyl acetate copolymer inner seal layer.

Referring now to FIG. 4, first and second seal jaws 10, 12 are shown in a closed position wherein their working surfaces may cooperate to engage the folded web of thermoplastic film 22 having zipper closures in the form of interlocked zipper closure elements 24, 26 (best shown in FIG. 1) for sealing. Cam 16 is designed so that the working surfaces of the seal jaws are rapidly closed on film web 22 to effect sealing and held in the closed position shown in FIG. 4 for a sufficient time, typically on the order of one second. Cam 16 then causes cam follower 18 to raise, the film web is advanced, and the cycle is repeated. First and second working surfaces 28, 30 of first seal jaw 10 are shown in more detail in FIG. 2, and third working surface 32 of second seal jaw 12 is shown in more detail in FIG. 3.

Figure 2:
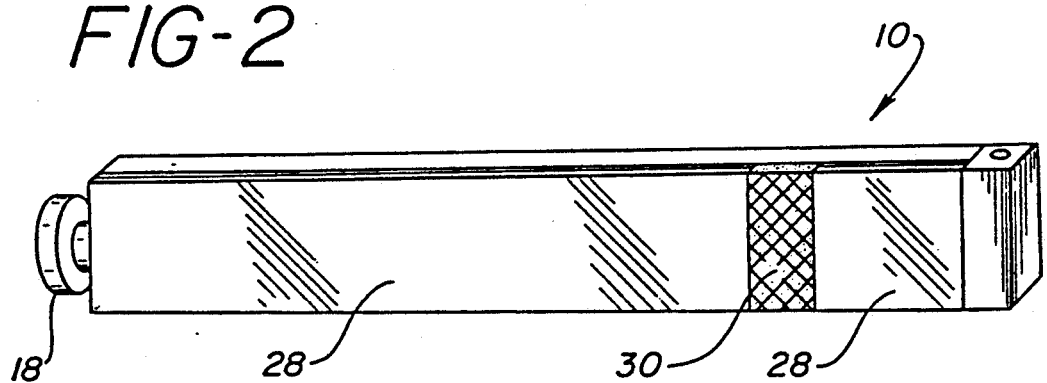
FIG. 2 is a perspective view of the first seal jaw of the present invention showing the first and second working surfaces thereof.

As shown in FIG. 2, first working surface 28 is comprised of a resilient pressure pad, such as a tough grade of silicone rubber which is unaffected by the sealing temperatures utilized in the first and second seal jaws 10, 12. It may have a relatively flat, untextured or unpatterned surface. Second working surface 30 is comprised of a patterned, heat-conductive, non-resilient surface, such as steel or aluminum which may be coated with a heat-resistant nonstick agent such as Teflon (trademark). As can be seen, second working surface 30 is wider than the zipper closure elements and is positioned so that it will engage the zipper closure elements even if there are positional changes of the elements on the film web. This enables the present invention to be used on a number of different sizes of container webs without modification to the seal jaws. A cross-hatched pattern is preferred for second working surface 30 to promote the flow of thermoplastic material during sealing. Other suitable patterned surfaces may also be used.

Referring now to FIG. 5, second working surface 30 is adjustably heated by heating elements 36, such as electrical resistance heaters, attached to a source of electrical power (not shown), and controlled by a conventional controller (not shown) and thermostats 38.

Figure 3:
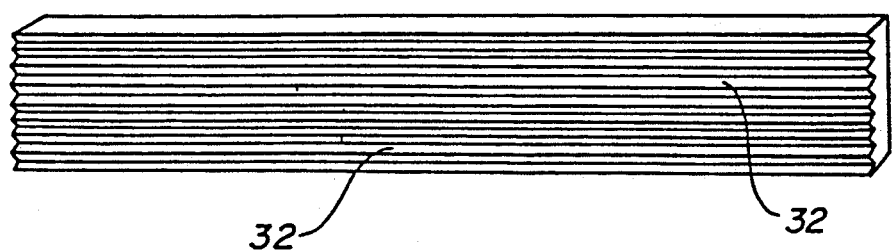
FIG. 3 is a perspective view of the second seal jaw of the present invention showing the third working surface thereof.

As shown in FIG. 3, third working surface 32 of second seal jaw 12 is comprised of heat-conductive, non-resilient material, such as steel or aluminum which may be coated with a heat-resistant nonstick agent such as Teflon (trademark). As best shown in FIG. 5, third working surface 32 is adjustably heated by heating elements 40, such as electrical resistance heaters attached to a source of electrical power (not shown), and controlled by a conventional controller (not shown) and thermostat 42. Third working surface 32 further comprises means for gripping a web of folded thermoplastic film 22 which may be a ribbed surface pattern, as shown in FIG. 3, or which may be a complementary cross-hatched pattern which matches the pattern on second working surface 30.

The provision of controllable heating elements in each of the seal jaws permits additional heat to be applied in the area of the zipper closure elements and also permits the apparatus to be adjusted for the particular film material to be sealed. For example, where the film web is a dual ply laminate of oriented polypropylene with an inner seal layer of Saran (trademark), both first seal bar 10 and second seal bar 12 are operated in the range of from 250–280 degrees F., and most preferably about 260 degrees F. This temperature is sufficient to melt the inner seal layer for obtaining a durable seal without causing undue deformation or shrinkage of the outer polypropylene layer.

Where a nylon web material is used having a heat sealable inner layer such as a copolymer of ethylene and vinyl acetate, the temperature on second seal jaw 12 may be increased to about 400 degrees F. while maintaining the temperature in the first seal jaw 10 in the range of from 250–280 degrees F. This increased temperature aids in the softening and flow of the zipper closure elements and the formation of a durable seal without adversely affecting the nylon outer layer.

A further aspect of the invention is shown in FIG. 4 where compressible means, such as springs 44a, 44b, support second seal jaw 12, and impose, in compression, a skewed or asymmetric loading profile upon second seal jaw 12. At least two compressible springs are preferred, as shown. Second seal jaw 12 may be displaced against springs 44a, 44b into housing 46, shown typically in FIGS. 4 and 1. Springs 44a and 44b are designed to have the same effective length, but different spring constants. Thus, when compressed, spring 44b, which has the higher spring constant, reacts with greater force than spring 44a, enhancing the sealing pressure upon zipper closures 24, 26. Other compressible means, such as unmatched pneumatic pistons or air shocks may be used to achieve the same results. However, springs are preferred.

For typical films used in commercial applications, the seal jaws 10, 12, in conjunction with springs 44a and 44b, are designed to place up to about 75–100 psi of pressure initially onto the zipper closure area of the film web while placing only about 15–20 psi of pressure onto the remaining areas of the web. This very high initial pressure on the zipper closure area of the film web, in conjunction with the heat supplied -by the heating elements in the seal jaws, provides a rapid softening and flow of polymer to form durable, fluid tight side seals and zipper end seals.

For purposes of illustration only, the present invention is shown in FIGS. 1 and 4 as being installed, on rotary drum machine 14. The present invention may also find use on vertical or horizontal flexible container manufacturing or packaging equipment. Likewise, while the means of opening and closing first and second seal jaws 10, 12 are shown as comprising a hinge 20, with cam 16 and cam follower 18, this arrangement is also merely representative. While this construction is preferred for use of the invention on rotary drums, other means of opening and closing first and second seal jaws 10, 12 may be suitable for installations of the present invention on other types of equipment, as discussed above.

An alternative embodiment of the present invention is shown in FIGS. 6 and 7. As shown, the present invention may be configured as a demountable second working surface 50 which may be retrofitted to existing flexible container manufacturing or packaging equipment. Demountable second working surface 50 is attached to first seal jaw 10 by conventional means (not shown), and has the same characteristics as second working surface 30. Demountable second working surface 50 includes heating elements 56 and thermocouples 58 connected and controlled in the same manner as previously described with respect to heating elements 36 and thermocouples 38. As further shown in the alternative embodiment of FIGS. 6 and 7, first seal jaw 10 of the present invention may further comprise a slot 48 having a cutting means, such as a knife 60, slidably disposed therein. So disposed, knife 60 may be reciprocated by conventional means known in the art to sever the side seals and zipper end seals formed by first and second seal jaws 10, 12 and thereby form individual flexible containers.

In operation, the present invention advantageously increases the heat and pressure in the area of the zipper closures to be sealed. Additional heat introduced to the seal jaws by heating elements 36 causes the thermoplastic material of the film web to soften and flow into voids between zipper closure elements 24, 26 and film 22 and form a durable seal, as well as causing the ends of zipper closure elements 24, 26 to fuse to each other. Intermeshing cross-hatched patterns, preferred on second and third working surfaces 30, 32, also promote the flow of the thermoplastic material and strengthen the resulting side seals and zipper end seals. The sealing pressure on zipper closure elements 24, 26 is further enhanced by springs 44a, 44b.

Finally, in accordance with the method of the present invention, flexible container manufacturing or packaging equipment, such as rotary drum 14, may be supplied with a web of thermoplastic film having zipper closure elements 24, 26 attached thereto without spot-sealing. Laminates of thermoplastic film known in the art are typically used in manufacturing flexible containers, and, in particular, for packaging foodstuffs. The film is folded, zipper closure elements 24, 26 brought into opposing, engagable or, alternatively, interlocked relationship, the folded web of thermoplastic film 22 is engaged between first and second seal jaws 10, 12 to form a first side seal and first zipper end seal, and then advanced to form a second side seal and second zipper end seal. In FIG. 1, first and second side seals are shown typically as side seal 62 and first and second zipper end seals are shown typically as zipper end seal 64. Seal time is typically in the range of 1 second. Film 22 is thereafter severed along the length of these first and second seals 62, generally along the center thereof, to form individual flexible containers or packages.

In accordance with the alternative embodiment of present invention shown in FIGS. 6 and 7, the step of severing may be accomplished after the first and second side seals 62 and first and second zipper end seals 64 are formed by inserting knife 60 through slot 48.

While certain representative embodiments and details have been shown and described for purposes of illustrating the invention, it will be apparent to those skilled in the art that various changes in the methods and apparatus disclosed herein may be made without departing from the scope of the invention which is defined in the appended claims.

What is claimed is:

1. An apparatus for sealing plies of thermoplastic film having zipper closures thereon to form a reclosable container comprising:
   opposing first and second seal jaws for engaging said thermoplastic film in an area to be sealed, said area including said zipper closures; said first seal jaw having first and second working surfaces, said first working surface comprising resilient means for engaging said area to be sealed, excluding said zipper closures; said second working surface comprising a patterned, nonresilient, heat-conductive surface positioned to engage said zipper closures in said areas to be sealed; and means for heating said second working surface for sealing said zipper closures in said areas to be sealed;

said second seal jaw having a third working surface, and means for heating said third working surface for sealing said areas to be sealed, including said zipper closures; said third working surface including means for gripping said thermoplastic film and means for engaging said zipper closures in said areas to be sealed.

2. An apparatus as recited in claim 1 wherein said third working surface on said second seal jaw includes a patterned surface which intermeshes with said pattern on said second working surface of said first seal jaw.

3. An apparatus as recited in claim 1 wherein said second working surface and said means for heating said second working surface are removably attached to said first seal jaw.

4. An apparatus as recited in claim 3 wherein said means for heating said second working surface comprises at least one electrical resistance heating element, and automatic means for controlling power input to said at least one heating element.

5. An apparatus as recited in claim 4 wherein said automatic means for controlling power input to said at least one heating element comprises at least one thermocouple adapted to measure thermal input to said second working surface; and power supply means for supplying electrical power to said at least one electrical heating element, said power supply means responsive to said at least one thermocouple.

6. An apparatus as recited in claim 1 wherein said means for gripping comprises a plurality of ribs oriented generally perpendicular to the direction of movement of said thermoplastic film and covering a first portion of said third working surface; and said means for engaging said zipper closures comprises a pattern intermeshable with said pattern on said second working surface and covering a second portion of said third working surface.

7. An apparatus as recited in claim 6 wherein said intermeshing pattern of said second working surface and said means for engaging comprises a crosshatched pattern.

8. An apparatus as recited in claim 6 wherein said intermeshing patterns of said second working surface and said second portion of said third working surface comprise a crosshatched pattern.

9. An apparatus as recited in claim 1 wherein said second seal jaw is disposed on a frame means for mounting, and said apparatus further comprises means for cyclically reciprocating said first seal jaw into sealing cooperation with said second seal jaw, said means for cyclically reciprocating comprising:

a hinge connecting the first end of said first seal jaw to the first end of said second seal jaw;

a cam follower disposed at the second end of said first seal jaw; and a cam connected to said frame means for mounting said second seal jaw, said cam follower slidably disposed in said cam.

10. An apparatus as recited in claim 9 wherein said frame means comprises a rotatable drum adapted to receive and convey thermoplastic film for sealing.

11. An apparatus as recited in claim 1 further comprising compressible means for supporting said second seal jaw which when compressed imposes an asymmetric sealing pressure profile upon said second seal jaw for increasing sealing pressure on said zipper closures in said area to be sealed.

12. An apparatus as recited in claim 11 wherein said compressible means comprises two or more springs having different spring constants.

13. An apparatus as recited in claim 11 wherein said asymmetric sealing pressure profile imposes 4 to 5 times greater pressure on said zipper closures in said area to be sealed than on said thermoplastic film in said area to be sealed, excluding said zipper closures.

14. An apparatus as recited in claim 1 wherein said first seal jaw includes a recess wherein said second working surface is disposed.

15. An apparatus as recited in claim 1 wherein said second working surface and said third working surface are heated to the same temperature.

16. An apparatus as recited in claim 1 wherein said second working surface and said third working surface are heated to different temperatures.

17. An apparatus for sealing plies of thermoplastic film having zipper closures thereon to form a reclosable container comprising:

opposing first and second seal jaws for engaging said thermoplastic film in an area to be sealed, said area including said zipper closures; said first seal jaw having first and second working surfaces, said first working surface comprising resilient means for engaging said area to be sealed, excluding said zipper closures; said second working surface comprising a patterned, non-resilient, heat-conductive surface positioned to engage said zipper closures in said area to be sealed; and said first seal jaw further comprising at least one heating element for adjustably heating said second working surface for sealing said zipper closures in said areas to be sealed; said second seal jaw having a third working surface, and means for heating said third working surfaces for sealing said areas to be sealed, including said zipper closures; said third working surface having a patterned surface for preventing slippage of said thermoplastic film, and means for engaging said zipper closures in said areas to be sealed;

means for cyclically reciprocating said first seal jaw into sealing cooperation with said second seal jaw; and compressible means for supporting said second seal jaw comprising two or more springs which when compressed impose an asymmetric sealing pressure profile upon said second seal jaw for increasing pressure on said zipper closures in said area to be sealed.

18. An apparatus as recited in claim 17 wherein said second working surface and said at least one heating element for adjustably heating said second working surface are removably attached to said first seal jaw.

19. An apparatus as recited in claim 17 wherein said means for engaging said zipper closures in said areas to be sealed comprises a pattern, intermeshable with said second working surface, which covers a portion of said third working surface.

20. An apparatus as recited in claim 17 further comprising automatic means for controlling power input to said second working surface.

21. An apparatus as recited in claim 17 wherein said resilient means is comprised of silicone rubber.

22. An apparatus as recited in claim 17 wherein said two or more springs have the same effective length and different spring constants.

23. An apparatus as recited in claim 17 wherein said asymmetric sealing pressure profile imposes 4 to 5 times greater pressure on said zipper closures in said area to be sealed than on said thermoplastic film in said area to be sealed, excluding said zipper closures.

24. A method for manufacturing reclosable thermoplastic containers comprising the steps of:
providing a folded web of thermoplastic film having opposing plies with engaged zipper closure elements attached thereto without spot sealing;
engaging said plies of said folded web of thermoplastic film between first and second seal jaws to form a first side seal and first zipper end seal of a flexible container, said step of engaging comprising:
subjecting said plies, excluding said zipper closure elements, to heat and pressure between a resilient first working surface of said first seal jaw and a heated third working surface of said second seal jaw;
subjecting said zipper closure elements to heat and pressure between a heated, non-resilient, patterned second working surface of said first seal jaw, and said heated third working surface of said second seal jaw;
compressing said second seal jaw with said first seal jaw against a compressible means for supporting said second seal jaw; and
said compressible means for supporting imposing an asymmetric pressure profile upon said second seal jaw;
advancing said film;
engaging said plies of said folded web of thermoplastic film between said first and second seal jaws to form a second side seal and a second zipper end seal of a container in the same manner as said first side seal and zipper end seals were formed; and
severing said plies of said folded web of thermoplastic film along the length of said first and said second side seals to form individual containers.

25. A method for manufacturing reclosable flexible containers as recited in claim 24 wherein said step of severing is performed while said plies of said folded web of thermoplastic film are engaged in said first and second seal jaws.

26. A method as recited in claim 4 wherein said compressible means for supporting said second seal jaw comprises two or more springs.

27. A method for manufacturing reclosable thermoplastic containers comprising the steps of:
providing a folded web of thermoplastic film having opposing plies with engaged zipper closure elements attached thereto without spot sealing;
engaging said plies of said folded web of thermoplastic film between first and second seal jaws to form a first side seal and first zipper end seal of a flexible container, said step of engaging comprising:
subjecting said plies, excluding said zipper closure elements, to heat and pressure between a resilient first working surface of said first seal jaw and a heated third working surface of said second seal jaw having a gripping pattern in a first portion thereof opposite said first working surface; and
subjecting said zipper closure elements to heat and pressure between a heated, non-resilient, patterned second working surface of said first seal jaw, and a second portion of said heated third working surface of said second seal jaw opposite said second working surface, said second portion having a pattern intermeshing with that of said second working surface; and
advancing said film;
engaging said plies of said folded web of thermoplastic film between said first and second seal jaws to form a second side seal and a second zipper end seal of a container in the same manner as said first side seal and zipper end seals were formed; and
severing said plies of said folded web of thermoplastic film along the length of said first and said second side seals to form individual containers.

28. A method for manufacturing reclosable flexible containers as recited in claim 18 wherein said step of engaging said plies to form said first and said second side seals and said first and second zipper end seals includes compressing said second seal jaw against two or more springs and imposing an asymmetric pressure profile upon said second seal jaw.

* * * * *